United States Patent [19]

Kuhn

[11] Patent Number: 4,617,669

[45] Date of Patent: Oct. 14, 1986

[54] METHOD AND APPARATUS FOR PUMPING LASANT SLABS

[75] Inventor: Kelin J. Kuhn, Mountain View, Calif.

[73] Assignee: Board of Trustees, Leland Stanford, Jr. University, Stanford, Calif.

[21] Appl. No.: 557,203

[22] Filed: Dec. 3, 1983

[51] Int. Cl.[4] .............................................. H01S 3/091
[52] U.S. Cl. ....................................... 372/70; 372/72; 372/34; 372/69
[58] Field of Search .............................. 372/66, 70–72, 372/34, 35

[56] References Cited

U.S. PATENT DOCUMENTS

| 3,665,335 | 5/1972 | Tomiyasu | 372/66 |
| 3,810,040 | 5/1974 | Martin et al. | 372/68 |
| 3,810,041 | 5/1974 | Martin | 372/68 |
| 4,207,541 | 6/1980 | Karger et al. | 372/71 |
| 4,233,567 | 11/1980 | Chernoch | 372/72 |

*Primary Examiner*—Léon Scott
*Attorney, Agent, or Firm*—Harry E. Aine

[57] ABSTRACT

In a slab laser, the optical pumping lamps extend transversely to the mean direction of the laser beam with the spatial period of the lamps being harmonically related to the spatial period of the zig-zag laser beam path within the slab, preferably with equal periods. In addition, the lamps are preferably positioned in registration over the lines of intersection of the central ray of the laser beam with respective broad face of the laser slab. A planar flashlamp reflector is employed for economy of fabrication. Directional lamp reflectors are employed for increasing laser efficiency and performance by discriminating against amplified surface waves.

14 Claims, 3 Drawing Figures

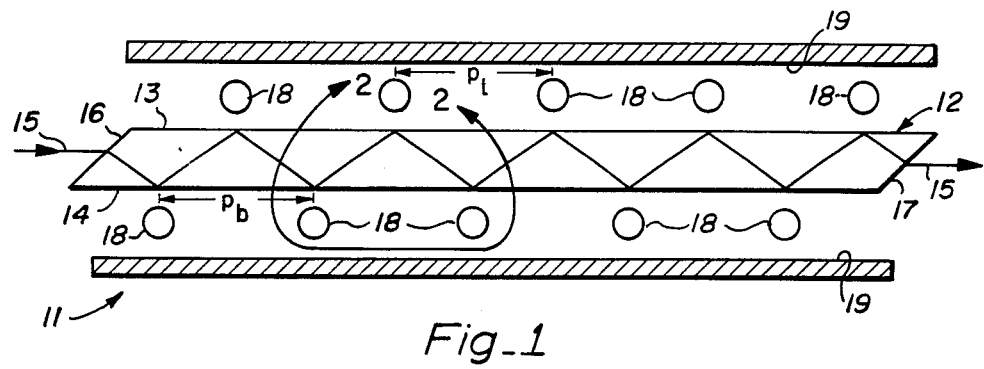
Fig_1
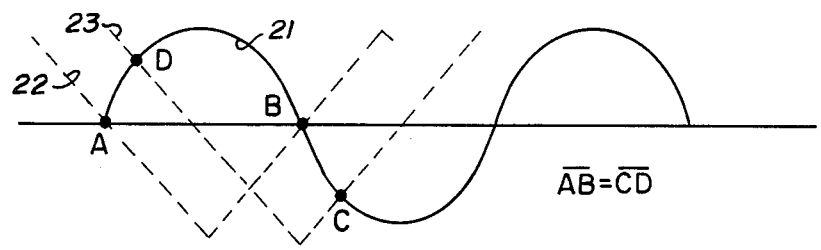
Fig_2
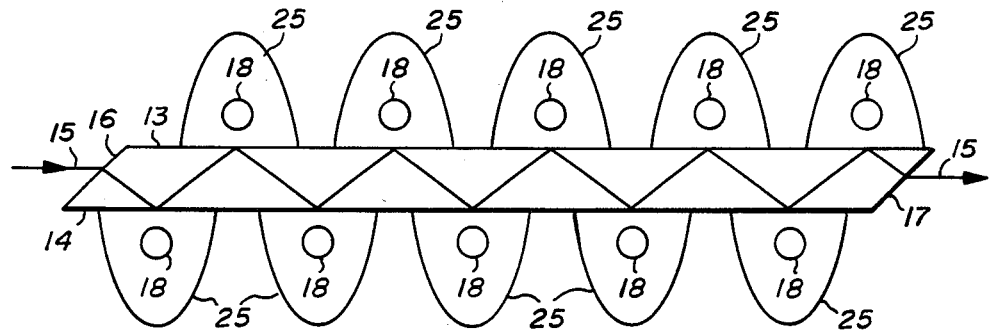
Fig_3

METHOD AND APPARATUS FOR PUMPING LASANT SLABS

GOVERNMENT CONTRACT

This invention was made in connection with performance of work under Government contract number DAA629-81-K-0038 with the Department of the U.S. Army.

BACKGROUND OF THE INVENTION

The present invention relates in general to slab lasers and more particularly to an improved method and apparatus for optically pumping the lasant slab.

DESCRIPTION OF THE PRIOR ART

Heretofore, slab lasers have employed flashlamps for optically pumping the slab of lasant material by directing pumping radiation through opposite broad faces of the lasant slab. The flashlamps were elongated cylindrical lamps extending axially of the slab and backed by a curved reflector so shaped as to obtain uniform illumination of the lasant slab. Examples of such prior art lasers are found in U.S. Pat. No. 3,633,126 issued Jan. 4, 1972.

Problems with such prior art slab lasers include: (1) relatively costly lamp reflector assemblies because of the elaborate (i.e., seagull wing) shaping of the reflector to achieve uniform illumination; (2) the relatively long flashlamps require relatively high voltages to initiate the arc, thereby necessitating relatively costly power supplies; and (3) uniform illumination of the broad faces of the laser slab provide substantial pumping energy for amplification of undesired competing surface laser waves, thereby decreasing the efficiency and performance of the laser.

SUMMARY OF THE PRESENT INVENTION

The principal object of the present invention is the provision of an improved method and apparatus for pumping lasant slabs and lasers using same.

In one feature of the present invention, the intensity of the pumping radiation directed through at least one of the major faces of the lasant slab is spatially periodic taken in the mean direction of the zig-zag laser beam, with the spatial period of the pumping radiation being related to the period of the zig-zag beam pattern such that each ray within the beam has essentially the same zig-zag pathlength traversing the length of the mean beam path within the lasant slab, whereby less elaborate and less costly flashlamp assemblies may be employed for pumping the lasant slab.

In another feature of the present invention, the spatial period of pumping radiation and of the zig-zag path are harmonically related.

In another feature of the present invention, the flashlamps are elongated transversely of the mean laser beam path within the lasant slab, whereby shorter and less costly lamps and power supplies may be employed.

In another feature of the present invention, a planar reflector is employed behind the pumping flashlamps, whereby less costly pumping lamp assemblies may be realized.

In another feature of the present invention, a periodic reflector is employed behind the flashlamps, whereby the amount of pumping radiation available at the surface relative to the amount of pumping radiation available to the zig-zag beam is decreased for improving the efficiency and performance of the slab laser.

Other features and advantages of the present invention will become apparent upon a pursual of the following specification taken in connection with the accompanying drawings wherein:

BRIEF DESCRIPTION OF THE DRAWINGS

FIG. 1 is a schematic longitudinal sectional view of a slab laser employing features of the present invention, FIG. 2 is an enlarged detailed view of a portion of the structure of FIG. 1 delineated by line 2—2 and depicting the thermal profile and ray traces for the laser beam, and FIG. 3 is a view similar to that of FIG. 1 depicting an alternative lamp reflector feature of the present invention.

DESCRIPTION OF THE PREFERRED EMBODIMENTS

Referring now to FIGS. 1 and 2, there is shown a longitudinal sectional view of a slab laser 11 incorporating features of the present invention. Slab lasers are disclosed in the aforecited U.S. Pat. No. 3,633,126 issued Jan. 4, 1972, the disclosure of which is hereby incorporated by reference in its entirety.

Briefly, the slab laser 11 includes a slab of lasant material 12, such as neodymium doped glass, having a pair of spaced broad faces 13 and 14 between which the central ray of the laser beam 15 of coherent radiation is internally reflected along a zig-zag path between a pair of narrow input and output faces 16 and 17. The laser beam 15 travels in a mean direction from the input face 16 to the output face 17 of the slab along a median plane between the broad faces 13 and 14.

Pumping radiation is directed from an array of transverse flashlamps 18 through the broad faces 13 and 14 into the slab 12 for inverting the population densities of the lasant energy states for transfer of power from the flashlamps 18 into the laser beam 15.

The flashlamps 18 are backed by a planar reflector 19, as of silver coated pyrex or nickel coated copper, for reflecting pumping radiation emitted from the lamps 18 back into the lasant slab 12.

In the embodiment of FIGS. 1 and 2, the flashlamps 18 on each side of the slab 12, have a spatial period, $P_1$, taken in the mean direction of the zig-zag laser beam, equal to the period, $P_b$, of the zig-zag beam 15. In addition, the lamp period and the laser beam period are brought into coincidence such that the lamps are centered on the lines of intersection of the central beam ray with the respective broad faces 13 and 14 of the lasant slab 12. The flashlamps 18 produce an attendant periodic thermal maxima profile within the lasant slab 12 with a period equal to that of the flashlamp period $p_l$ as shown by curve 21 of FIG. 2 which depicts the minus temperature maxima which is spatially 180 degrees out of phase with the positive temperature maxima.

The period of the thermal maxima profile 21, when equal to the period of zig-zag laser beam, causes each ray of the laser beam to encounter equal and opposite temperature variation patterns per period of the zig-zag path. Thus, temperature gradient (gradient in the refractive index) induced path length changes encountered by each beam ray in one part of its period is offset by equal and opposite path length changes encountered in a second part of its period. This is illustrated in FIG. 2 where different laser beam rays 22 and 23 having the same period as that of the thermal maxima profile 21 are depicted. The path length $\overline{AB}$ for ray 22 is equal to the path length $\overline{CD}$ for ray 23.

Although the preferred embodiment uses the harmonic relationship that the period $p_l$ of the lamps 18 and therefore of the thermal profile on each side of the slab 12 is equal to and is in transverse registration with the period $p_b$ of the central laser beam ray 15, this is not a requirement. Other harmonic relationships of $p_l$ to $p_b$ will also allow averaging of thermal focusing effects. Examples of these include $p_b$ to $p_l = \frac{1}{2}$; to $p_l = 2$, etc.

As thus far described, the flashlamps 18 have used a planar reflector 19 for directing the pumping radiation into the laser slab 12, this is not a requirement.

Referring now to FIG. 3, there is shown an alternative embodiment wherein directional reflectors 25, as of parabolic shape, are employed behind respective ones of the transverse flashlamps 18. By focusing the pumping radiation into the laser slab 12, the laser beam 15 sees a much higher gain than does the unwanted and competing surface beam or wave produced by amplified spontaneous emission (ASE). Since surface ASE is a principal contributor to reduced slab laser performance, reduction in the surface ASE increases the efficiency and performance of a given slab laser 11.

The advantages of the present invention include: (1) the length of the laser slab 12 is not related to the length of the flashlamps 18 when the present transverse geometry is used. All of the flashlamps 18 in a given laser chain (oscillator—pre-amplifier—first amplifier—second amplifier) can be identical. This allows all of the lamps in a given laser system to be identical which is certainly of advantage in reducing the fabrication costs; (2) use of very short lamps in the transverse geometry of the present invention allows the potential applied to the lamps to be reduced to a few hundred volts. This allows a laser with an output power in the range of one to ten joules per pulse to run directly from 110 V or 220 V outlets. This dramatically reduces the cost of a commercial laser system; (3) the use of many short flashlamps 18 permits a larger variety of electrical connections, for example, connecting the lamps 18 in series and running them from a high voltage source results in a short-pulse laser; suitable for creation of laser plasmas. However, connecting the lamps 18 in parallel and running them from a lower voltage source results in a long pulse laser; suitable for machining applications. This means that rearrangement of the electrical connections on a transverse flashlamp laser can convert the laser from one application to another. This type of commonality further reduces the manufacturing costs.

What is claimed is:

1. In a method for optically pumping a slab of lasant material of the type having a pair of spaced apart broad side faces and a pair of spaced apart narrow side faces, the steps of:
    internally reflecting a laser beam of coherent radiation within the slab back-and-forth in a zig-zag path between and intersecting with the broad side faces as the coherent beam travels in a lengthwise direction within the slab falling in a mid-plane between the broad faces,
    directing optical pumping radiation through at least one of said broad faces of said lasant slab for inverting the population densities of lasant energy levels within said lasant slab for transferring power into the laser beam;
    the intensity of said pumping radiation, as directed into said lasant slab, being spatially periodic taken in the lengthwise direction of the travel of the laser beam within the slab and having an attendant spatially periodic temperature maxima profile within the lasant slab taken in the lengthwise direction of travel of the laser beam within the laser slab; and
    positioning the periodicity of the thermal maxima profile relative to the periodicity of the zig-zag laser beam path such that each ray within the laser beam has generally the same zig-zag path length over the same length of the lengthwise path length of the laser beam within the slab.

2. The method of claim 1 wherein the period of the thermal maxima profile is harmonically related to the period of the zig-zag laser beam path within the lasant slab.

3. The method of claim 1 wherein the laser beam has a central ray, and wherein the period of the thermal maxima profile on each face of the slab is equal to the period of the zig-zag beam path within the lasant slab and is disposed in transverse registration wherein said period of said thermal maxima profile generally coincides with the intersection of the central ray of the laser beam with the respective broad face of the laser slab.

4. The method of claim 1 wherein said periodic pumping radiation is directed into said lasant slab through both broad faces of said slab to produce said attendant periodic temperature maxima profile within said lasant slab.

5. The method of claim 1 wherein elongated arc lamp portions are employed to generate the pumping radiation and wherein the longitudinal axes of said arc lamp portions are directed generally transverse to the lengthwise direction of the laser beam within the lasant slab.

6. The method of claim 5 including employing a planar reflector behind said arc lamp portions for reflecting pumping radiation emitted from said arc lamp portions into said lasant slab.

7. The method of claim 5 including employing a periodic reflector behind said arc lamp portions for decreasing the optical pumping energy available at the surface of said slab for amplification of the spontaneous emission surface laser wave.

8. In a slab laser apparatus of the type having a slab of lasant material with a pair of spaced broadside faces and a pair of narrow side faces and a beam of coherent radiation with a central ray being internally reflective of the slab back-and-forth in a zig-zag path between and intersecting with the broad faces as the beam travels in a lengthwise direction within the slab which is generally in the mid-plane between the broad faces:
    means for directing optical pumping radiation through at least one of said broad faces of said lasant slab for inverting the population densities of lasant energy levels within said lasant slab for transferring power into the laser beam;
    the intensity of said pumping radiation as directed into said lasant slab being spatially periodic taken in the lengthwise direction of the travel of the laser beam within said slab and having an attendant spatially periodic temperature maxima profile within said lasant slab taken in the lengthwise direction of the travel of the laser beam within said slab; and
    said optical pumping means being formed and positioned such that the spatial periodicity of the thermal maxima profile relative to the spatial periodicity of the zig-zag laser beam path is such that each ray within the laser beam has generally the same zig-zag path length over the same length of the lengthwise path length of the laser beam within said slab.

9. The apparatus of claim 8 wherein the period of the thermal maxima profile is harmonically related to the period of the zig-zag laser beam path within the lasant slab.

10. Apparatus of claim 8 wherein the period of the thermal maxima profile at each face of said lasant slab is equal to the period of the zig-zag beam path within the lasant slab and wherein said thermal maxima profile at its point of closest approach to the face of said lasant slab generally coincides with the intersection of the central ray of the laser beam with the respective broad face of said lasant slab.

11. The apparatus of claim 8 wherein said optical pumping means directs said periodic pumping radiation into said lasant slab through both broad faces of said slab to produce said attendant spatial periodic temperature maxima profile within said lasant slab.

12. The apparatus of claim 8 wherein said pumping means includes elongated arc lamp portions employed to generate said pumping radiation and wherein the longitudinal axes of said elongated arc lamp portions are directed generally transverse to the lengthwise direction of the laser beam within said lasant slab.

13. The apparatus of claim 12 wherein said optical pumping means includes a planar reflector disposed behind said arc lamp portions for reflecting pumping radiation emitted from said arc lamp portion into said lasant slab.

14. The apparatus of claim 12 wherein said pumping means includes reflector means which are spatial periodic and disposed behind said arc lamp portions for directing said pumping radiation into said lasant slab and for decreasing the optical pumping energy available at the surface of said lasant slab for amplification of spontaneous emission surface laser waves, whereby increased laser efficiency is obtained and laser performance improved.

* * * * *